United States Patent
Kanda et al.

(10) Patent No.: US 11,390,269 B2
(45) Date of Patent: Jul. 19, 2022

(54) VEHICLE CONTROL SYSTEM

(71) Applicant: HONDA MOTOR CO., LTD., Tokyo (JP)

(72) Inventors: Ryoma Kanda, Saitama (JP); Yuya Goto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 106 days.

(21) Appl. No.: 16/915,229

(22) Filed: Jun. 29, 2020

(65) Prior Publication Data
US 2021/0001835 A1 Jan. 7, 2021

(30) Foreign Application Priority Data
Jul. 1, 2019 (JP) .............................. JP2019-122686

(51) Int. Cl.
*B60W 30/02* (2012.01)
*B60W 10/20* (2006.01)
(Continued)

(52) U.S. Cl.
CPC ............ *B60W 30/02* (2013.01); *B60W 10/04* (2013.01); *B60W 10/184* (2013.01);
(Continued)

(58) Field of Classification Search
CPC .... B60W 30/02; B60W 10/04; B60W 10/184; B60W 10/20; B60W 10/22;
(Continued)

(56) References Cited

U.S. PATENT DOCUMENTS

2003/0074122 A1* 4/2003 Hac .................. B62D 7/159
701/70
2004/0054450 A1* 3/2004 Nakamura ................ B60L 7/26
701/22
(Continued)

FOREIGN PATENT DOCUMENTS

| JP | H10322464 A | 12/1998 | |
| JP | 2008155703 A | * 7/2008 | ............. B62D 6/003 |

(Continued)

OTHER PUBLICATIONS

JP Notice of Reasons for Refusal for JP Patent Application 2019-122686 dated Jun. 8, 2021; 12 pp.
(Continued)

*Primary Examiner* — Jonathan M Dager
*Assistant Examiner* — Jean W Charleston
(74) *Attorney, Agent, or Firm* — Armstrong Teasdale LLP

(57) ABSTRACT

A vehicle control system (30) for controlling a behavior control device (20) that controls a behavior of a vehicle (1), comprising: a feed-forward computing unit (71) that computes a feed forward control amount of the behavior control device according to a steering angle of the vehicle; a feedback computing unit (72) that computes a feedback control amount of the behavior control device according to a difference between a target vehicle state amount computed from the steering angle and an actual vehicle state amount; a correcting unit (73) that computes a corrected feed-forward control amount by correcting the feed forward control amount according to the feedback control amount; and a target control amount computing unit (74) that computes a target control amount of the behavior control device according to the feedback control amount and the corrected feed forward control amount.

7 Claims, 4 Drawing Sheets

(51) Int. Cl.
*B60W 10/184* (2012.01)
*B60W 10/22* (2006.01)
*B60W 10/04* (2006.01)
*B60W 50/00* (2006.01)

(52) U.S. Cl.
CPC ............ *B60W 10/20* (2013.01); *B60W 10/22* (2013.01); *B60W 2050/0008* (2013.01); *B60W 2050/0012* (2013.01); *B60W 2050/0022* (2013.01); *B60W 2510/207* (2013.01); *B60W 2540/18* (2013.01)

(58) Field of Classification Search
CPC . B60W 2050/0008; B60W 2050/0012; B60W 2050/0022; B60W 2510/207; B60W 2540/18; B60T 2260/022; B60T 8/1755; B62D 7/159; B62D 6/003
USPC .......................................................... 701/41
See application file for complete search history.

(56) References Cited

U.S. PATENT DOCUMENTS

| | | | |
|---|---|---|---|
| 2004/0122579 A1* | 6/2004 | Ashizawa | B60K 6/44 701/22 |
| 2004/0128044 A1* | 7/2004 | Hac | B62D 6/003 701/48 |
| 2004/0193345 A1 | 9/2004 | Hsien et al. | |
| 2009/0024293 A1* | 1/2009 | Takenaka | B60W 10/12 701/71 |
| 2010/0004825 A1 | 1/2010 | Shiro et al. | |
| 2015/0094925 A1* | 4/2015 | Senoo | F16D 63/006 701/70 |
| 2016/0236672 A1* | 8/2016 | Yanagida | B60W 10/06 |
| 2017/0015314 A1* | 1/2017 | Tanase | B60T 1/10 |
| 2017/0088174 A1* | 3/2017 | Inoue | B62D 5/0457 |
| 2017/0137008 A1* | 5/2017 | Takase | B60T 8/88 |

FOREIGN PATENT DOCUMENTS

| | | |
|---|---|---|
| JP | 2008155703 A | 7/2008 |
| JP | 2008290720 A | 12/2008 |
| JP | 2014148299 A | 8/2014 |
| JP | 2018203016 A | 12/2018 |

OTHER PUBLICATIONS

Miori, Kazunori, "Maneuverability and Stability of Vehicles through Control Combined Right/Left Torque Distribution and Four-Wheel-Steering," Transactions of the JSME, vol. 64, 1998, No. 96-1870; pp. 530-537.

Derrick, J. Benton et al., "Adaptive Control of a Farm Tractor with Varying Yaw Dynamics Accounting for Actuator Dynamics and Saturations," 17th IEEE International Conference on Control Applications, San Antonio, TX, Sep. 3-5, 2008; pp. 547-552.

* cited by examiner

VEHICLE CONTROL SYSTEM

TECHNICAL FIELD

The present invention relates to a vehicle control system.

BACKGROUND ART

A known rear wheel steering control system computes a feed-forward control amount from the front wheel steering angle and the vehicle speed, computes a feedback control amount from the yaw rate deviation between the target yaw rate and the actual yaw rate, and determines the rear wheel steering angle from the feed-forward control amount and the feedback control amount (see JPH10-322464A, for instance).

According to this known rear wheel steering control system, the feed-forward control is mainly used in normal driving conditions, and the feedback control is applied to the feed-forward control as the driving condition approaches a limit driving condition region where the gravitational center slip angle is significant. However, since the feed-forward control is designed on the assumption of normal driving conditions, the control amount significantly increases when the front wheel steering angle is increased in a limit driving condition. Therefore, when both feed-forward control and feedback control are used together in a limit driving condition range, the control amount may be increased to such an extent the stability of the vehicle may not be maintained.

SUMMARY OF THE INVENTION

In view of such a problem of the prior art, a primary object of the present invention is to provide a vehicle control system for controlling the behavior control device of a vehicle using both feed-forward control and feedback control that can stabilize the behavior of the vehicle in a limit driving condition range.

To achieve such an object, the present invention provides a vehicle control system (30) for controlling a behavior control device (20) that controls a behavior of a vehicle (1), comprising: a feed-forward computing unit (71) that computes a feed forward control amount of the behavior control device according to a steering angle of the vehicle; a feedback computing unit (72) that computes a feedback control amount of the behavior control device according to a difference between a target vehicle state amount computed from the steering angle and an actual vehicle state amount; a correcting unit (73) that computes a corrected feed-forward control amount by correcting the feed forward control amount according to the feedback control amount; and a target control amount computing unit (74) that computes a target control amount of the behavior control device according to the feedback control amount and the corrected feed forward control amount.

Since the feed-forward control amount is corrected according to the feedback control amount, the target control amount is prevented from becoming excessive with the result that the behavior of the vehicle in the limit driving condition range can be stabilized.

Preferably, in this vehicle control system, the correcting unit is configured to set a degenerate gain of 0 to 1 according to the feedback control amount, and compute the corrected feed-forward control amount by multiplying the feed-forward control amount by the degenerate gain, the degenerate gain decreasing from 1 to 0 according to an increase in the feedback control amount.

Thereby, the feed-forward control amount can be decreased in response to an increase in the feedback control amount.

Preferably, in this vehicle control system, the behavior control device includes a plurality of behavior control devices, and the vehicle control system further comprises a feed-forward control amount distribution unit (54) configured for computing a distribution feed-forward control amount which is to be distributed to each of the behavior control devices, the correcting unit being configured to compute a corrected feed-forward control amount for each of the behavior control devices by correcting each of the distribution feed-forward control amounts individually by a corresponding correction amount.

Thereby, the correction amount of the feed-forward control amount of each behavior control device can be changed individually with the result that the control amounts of the behavior control devices which may become excessive in the limit driving condition range can be individually prevented from becoming excessive.

Preferably, in this vehicle control system, the correcting unit is configured to set a degenerate gain of 0 to 1 for each of the distribution feed-forward control amounts according to the corresponding feedback control amount, and compute the corrected distribution feed-forward control amount by multiplying each degenerate gain to the corresponding distribution feed-forward control amount, the degenerate gain decreasing from 1 to 0 with an increase in the feedback control amount.

Thereby, the correction amount of the feed-forward control amount of each behavior control device can be changed individually.

Preferably, in this vehicle control system, the behavior control devices include a rear wheel steering device (15) that changes a steering angle of a rear wheel, and a power distribution device (9) that distributes a driving power generated by a power plant (7) to each wheel of the vehicle, and the degenerate gain (G1) for the distribution feed-forward control amount of the rear wheel steering device decreases with an increase in the feedback control amount earlier than the degenerate gain (G2) for the distribution feed-forward control amount of the power distribution device.

According to this arrangement, the behavior of the vehicle can be stabilized in a favorable manner by suppressing the feed-forward control of the rear wheel steering device which has a greater impact on the turning behavior of the vehicle in the limit driving condition range than the feed-forward control of the power distribution device.

Preferably, in this vehicle control system, the behavior control devices include a power distribution device (15) that distributes a driving power generated by a power plant (7) to each wheel of the vehicle, and a brake device (20) for individually generating brake force in each wheel, and the degenerate gain (G2) for the distribution feed-forward control amount of the power distribution device decreases with an increase in the feedback control amount earlier than the degenerate gain (G1) for the distribution feed-forward control amount of the brake device.

According to this arrangement, the behavior of the vehicle can be stabilized in a favorable manner by suppressing the feed-forward control of the brake device which have a greater impact on the turning behavior of the vehicle than the feed-forward control of the power distribution device in the limit driving condition range.

Preferably, in this vehicle control system, the behavior control devices include a brake device (20) for individually generating brake force in each wheel, and a damper (3D, 5D) having a variable damping factor and provided for each wheel, and the degenerate gain (G3) for the distribution feed-forward control amount of the brake device decreases with an increase in the feedback control amount earlier than the degenerate gain (G4) for the distribution feed-forward control amount of the dampers.

According to this arrangement, the behavior of the vehicle can be stabilized in a favorable manner by suppressing the feed-forward control of the brake device which have a greater impact on the turning behavior of the vehicle than the feed-forward control of the dampers in the limit driving condition range.

Preferably, in this vehicle control system, the behavior control devices include a rear wheel steering device (15) for changing steering angle of the rear wheels, a power distribution device (9) for distributing a driving power generated by a power plant (7) to each wheel of the vehicle, a brake device (20) for individually generating brake force in each wheel, and a damper (3D, 5D) having a variable damping factor and provided for each wheel, and the degenerate gain (G1) for the distribution feed-forward control amount of the rear wheel steering device, the degenerate gain (G2) for the distribution feed-forward control amount of the power distribution device, the degenerate gain (G3) for the distribution feed-forward control amount of the brake device, and the degenerate gain (G4) for the distribution feed-forward control amount of the damper decrease with an increase in the feedback control amount in an order of those of the rear wheel steering device, the power distribution device, the brake device and the damper.

According to this arrangement, the behavior of the vehicle can be stabilized in a favorable manner by preferentially suppressing those vehicle behavior control devices that have a greater impact on the turning behavior of the vehicle in the limit driving condition range.

Preferably, in this vehicle control system, the correcting unit is configured to determine if the vehicle demonstrates an oversteer tendency, and if no oversteer tendency is determined, the degenerate gain is set to 1 without regard to values of the feedback control amounts.

Thus, when the vehicle does not demonstrate an oversteer tendency, the control amount of the feed-forward control is not reduced so that the vehicle behavior can be quickly brought to a target behavior.

According to the foregoing configurations of the present invention, in the vehicle control system that controls the behavior control devices by feed-forward control and feedback control, the behavior of the vehicle can be stabilized in a limit driving condition range.

DETAILED DESCRIPTION OF THE PREFERRED EMBODIMENT(S)

The present invention is described in the following in more detail in terms of a concrete embodiment with reference to the appended drawings.

Figure 1:
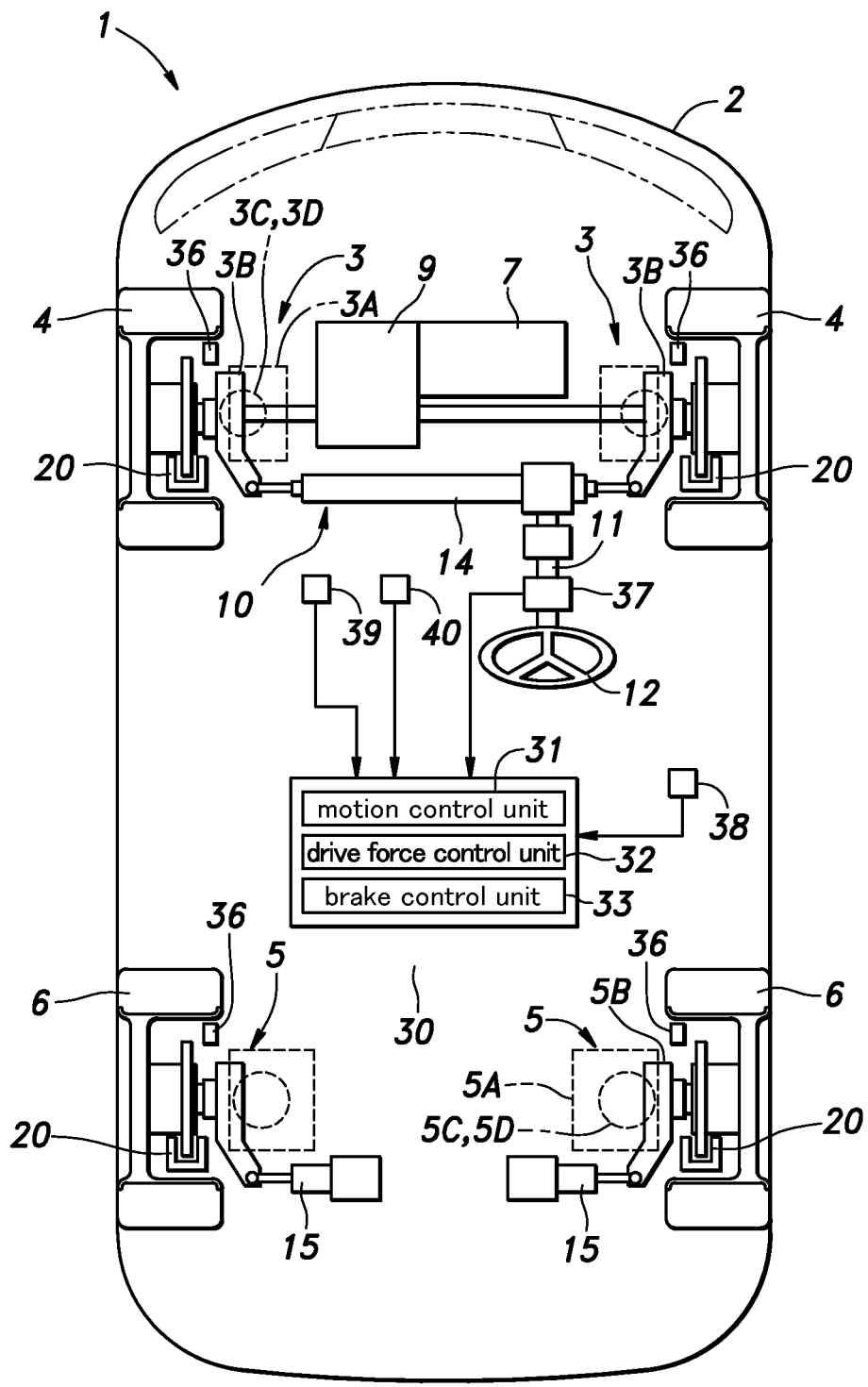
FIG. 1 is a schematic diagram of a vehicle fitted with a behavior control system according to an embodiment of the present invention.

As shown in FIG. 1, a vehicle 1 is provided with a pair of front wheels 4 each supported by a front suspension device 3, and a pair of rear wheels 6 each supported by a rear suspension device 5. Each suspension device 3, 5 is provided with suspension arms 3A, 5A pivotally supported by a vehicle body 2 at base ends thereof, a knuckle 3B, 5B pivotally supported by the suspension arms 3A, 5A at free ends thereof, and a spring 3C, 5C and a damper 3D, 5D interposed between the knuckle (or one of the suspension arms) and the vehicle body 2. The dampers 3D, 5D of the illustrated embodiment each consist of a variable damper that can change the damping factor or a damping property thereof. For instance, each damper 3D, 5D may be filled with magneto-viscous fluid that can change the viscosity thereof in dependence on the intensity of the magnetic field applied thereto.

As shown in FIG. 1, the vehicle 1 is provided with a power plant 7 (power source) to drive the wheels 4, 6. The power plant 7 may be an internal combustion engine, such as a gasoline engine or a diesel engine, and/or an electric motor. The driving force of the power plant 7 is distributed to the right and left front wheels 4 and rear wheels 6 via a power distribution device 9. The power distribution device 9 can change the distribution ratio of the driving force to be transmitted to each wheel 4, 6.

The front wheels 4 of the vehicle 1 can be steered by a steering device 10 of the vehicle 1 which includes a steering shaft 11 that is supported by the vehicle so as to be rotatable around its own axis, a steering wheel 12 fitted to an upper end of the steering shaft 11, a rack 14 extending laterally so as to be slidable in the lateral direction and having two ends connected to the knuckles 4B of the respective front wheels 4. A pinion fitted to a lower end of the steering shaft 11 meshes with the rack 14 so that the steering input applied to the steering wheel 12 is converted into the steering movement of the front wheels 4. The steering shaft 11 is fitted with an electric motor for providing an assisting steering torque to reduce the driver's effort required to turn the steering wheel 12.

The vehicle 1 is further provided with a per se known rear wheel steering device 15 that steers the left and right rear wheels 6. The rear wheel steering device 15 includes a pair of electric motors for the respective rear wheels 6, and a pair of steering rods which advance and retreat under the driving forces of the respective electric motors so that the rear wheels 6 can be steered independently from each other via the respective steering rods.

The vehicle 1 is provided with a brake device 20 which includes individual hydraulic actuators for applying braking forces to the front wheels 4 and the rear wheels 6. In particular, the brake device 20 is configured such that the braking forces applied to the four wheels (the front wheels 4 and the rear wheels 6) can be individually controlled.

The vehicle 1 is provided with a control unit 30 (vehicle control unit). The control unit 30 is an electronic control circuit (ECU) consisting of a microcomputer, ROM, RAM, peripheral circuits, I/O interfaces, various drivers, etc. The control unit 30 is provided with a motion control unit 31, a drive force control unit 32, and a brake control unit 33. The motion control unit 31 computes an applied yaw moment, an applied roll moment, an applied pitch moment, an applied lateral force, and an applied vertical force that are to be applied to the vehicle 1 according to vehicle state variables which represent the vehicle's dynamic state, and controls the brake device 20, the dampers 3D, 5D, the rear wheel steering device 15, and the power distribution device 9 which are configured to generate the corresponding applied moments or forces and thus function as behavior control devices.

The brake device 20 can be used to produce an applied yaw moment, an applied roll moment, an applied pitch moment, and an applied lateral force. The dampers 3D, 5D can be used to produce an applied roll moment, an applied pitch moment, and an applied vertical force. The rear wheel steering device 15 can be used to generate an applied yaw moment and an applied lateral force. The power distribution device 9 can be used to produce an applied yaw moment and an applied lateral force.

The vehicle state variables include the front wheel steering angle δf (the steering angle of the front wheels 4), the rear wheel steering angle δr (the steering angle of the rear wheels 6), the vehicle speed V (the traveling speed of the vehicle 1), the lateral acceleration of the vehicle 1, the accelerator pedal position PA, the brake pedal position PB, the actual yaw rate of the vehicle 1, the fore and aft acceleration of the vehicle 1, and so on. The drive force control unit 32 computes the target drive force to be generated by the power plant 7 from the accelerator pedal position PA (and possibly other factors), and controls the power plant 7 according to the computed target drive force. The brake control unit 33 computes the target braking force to be generated by the brake device 20 according to the brake pedal position PB (and possibly other factors), and controls the braking force according to the target braking force. The braking force applied to each wheel may be varied from one wheel to another according to control requirements.

The vehicle body 2 is fitted various sensors such as a vehicle speed sensor 36, a steering angle sensor 37, a yaw rate sensor 38, an accelerator pedal sensor 39, and a brake pedal sensor 40 as means for detecting vehicle state variables. A vehicle speed sensor 36 includes wheel speed sensors which are provided on the respective wheels 4, 6, and the output pulse signals generated in response to the rotation of the wheels 4, 6 are forwarded to the control unit 30. The control unit 30 thus receives the rotational speeds of the wheels 4 and 6 (wheel speeds) from the signals from the vehicle speed sensor 36, and computes the vehicle speed V by averaging the wheel speeds. The steering angle sensor 37 outputs a signal corresponding to the steering angle of each wheel 4, 6 to the control unit 30. The control unit 30 obtains the steering angle δi of each wheel from the signal from the steering angle sensor 37. The yaw rate sensor 38 outputs a signal corresponding to the yaw rate generated in the vehicle 1 to the control unit 30. The control unit 30 obtains an actual yaw rate γR from the signal obtained by the yaw rate sensor 38. The accelerator pedal sensor 39 is provided on the accelerator pedal to output a signal corresponding to the position of the accelerator pedal to the control unit 30. The brake pedal sensor 40 is provided on the brake pedal to output a signal corresponding to the position of the brake pedal to the control unit 30.

The vehicle body 2 may be provided with a lateral acceleration sensor to detect the lateral acceleration of the vehicle 1, a fore and aft accelerator sensor to detect the fore and aft acceleration of the vehicle 1, etc. as means for detecting such vehicle state variables. The control unit 30 may take into account the lateral acceleration and the fore and aft acceleration in executing the control process.

Figure 2:
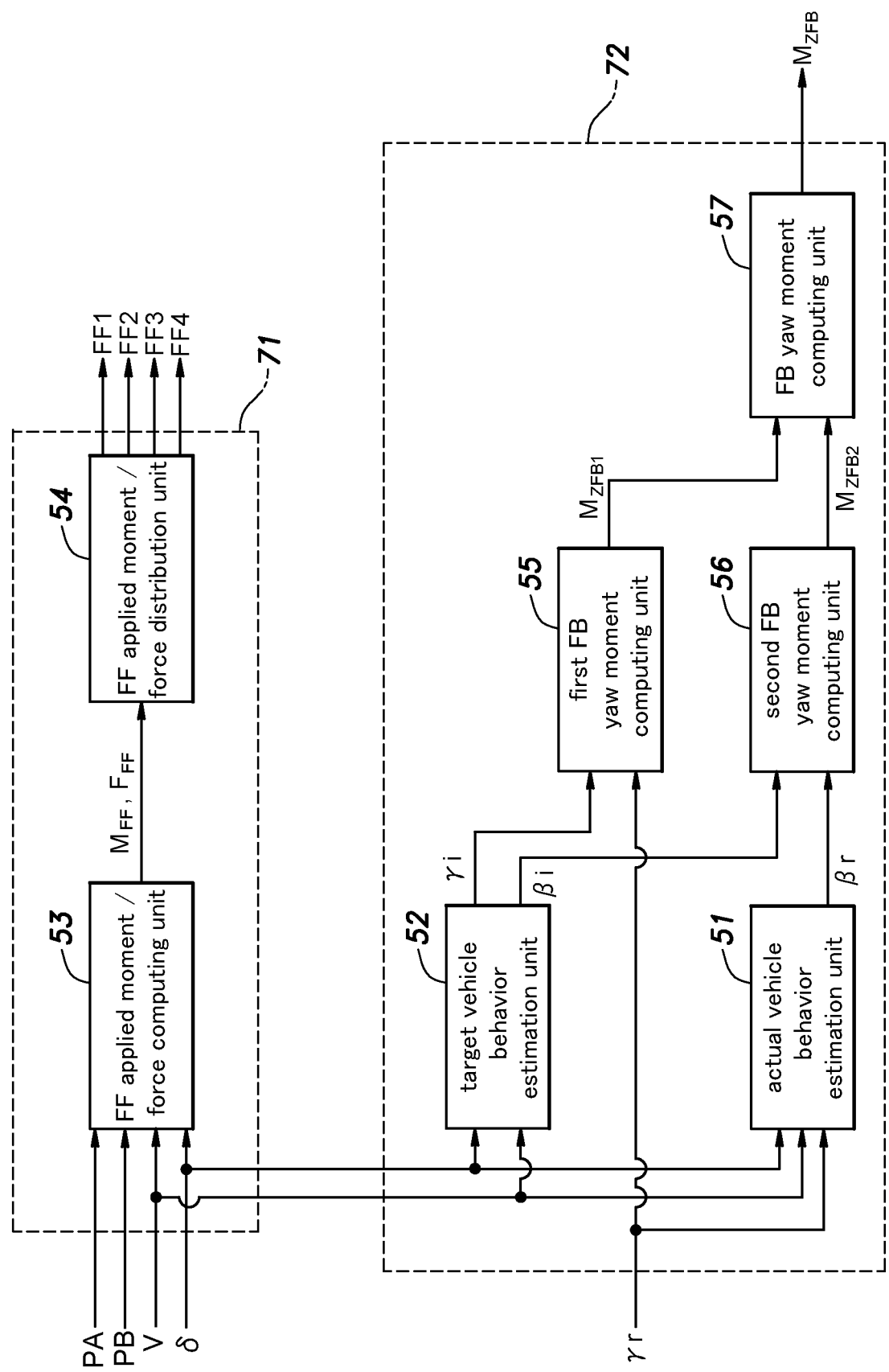
FIG. 2 is a functional block diagram of a first part of a motion control unit of the behavior control system.
Figure 3:
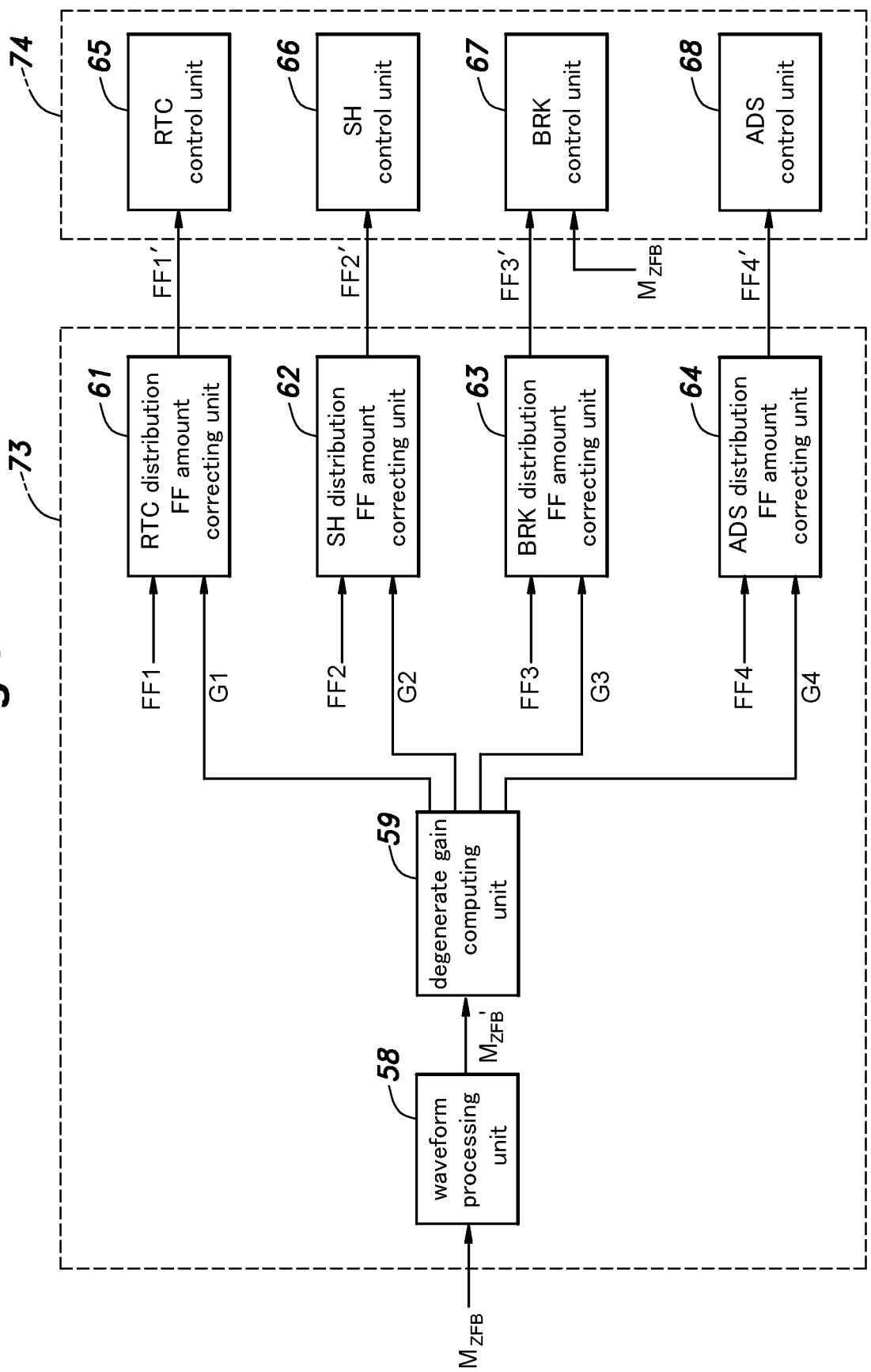
FIG. 3 is a functional block diagram of a second part of the motion control unit of the behavior control system.

As shown in FIGS. 2 and 3, the motion control unit 31 is provided with an actual vehicle behavior estimation unit 51, a target vehicle behavior estimation unit 52, a FF applied moment/force computing unit 53, a FF applied moment/force distribution unit 54, a first FB yaw moment computing unit 55, a second FB yaw moment computing unit 56, a FB yaw moment computing unit 57, a waveform processing unit 58, a degenerate gain computing unit 59, a RTC distribution FF amount correcting unit 61, a SH distribution FF amount correcting unit 62, a BRK distribution FF amount correcting unit 63, a ADS distribution FF amount correcting unit 64, a RTC control unit 65, a SH control unit 66, a BRK control unit 67, and a ADS control unit 68. The FF applied moment/force computing unit 53 and the FF applied moment/force distribution unit 54 constitute a feed-forward (FF) computing unit 71. The actual vehicle behavior estimation unit 51, the target vehicle behavior estimation unit 52, the first FB yaw moment computing unit 55, the second FB yaw moment computing unit 56, and the FB yaw moment computing unit 57 constitute a feedback (FB) computing unit 72. The waveform processing unit 58, the degenerate gain computing unit 59, the RTC distribution FF amount correcting unit 61, the SH distribution FF amount correcting unit 62, the BRK distribution FF amount correcting unit 63, and the ADS distribution FF amount correcting unit 64 constitute a correcting unit 73, while the RTC control unit 65, the SH control unit 66, the BRK control unit 67, and the ADS control unit 68 constitute a target control amount computing unit 74.

The feed-forward computing unit 71 computes the feed-forward control amount of the behavior control devices including the brake device 20, the dampers 3D, 5D, the rear wheel steering device 15, and the power distribution device 9 according to the steering angles δi, the vehicle speed V, the accelerator pedal position PA, and the brake pedal position PB. The subscript "i" in these symbols are integers of 1-4 (1: front left wheel (FL), 2: front right wheel (FR), 3: rear left wheel (RL), 4: front right wheel (RR)) indicating the corresponding wheels 4 and 6. The steering angles δi of the front wheels 4 are thus the front wheel steering angle δf (=δ1=δ2), and the steering angles δi of the rear wheels 6 are the rear wheel steering angle δr (=δ3=δ4). The FF applied moment/force computing unit 53 of the feed-forward computing unit 71 computes at least one of the FF applied moment Madd and the FF applied force Fadd from the steering angles δi and vehicle speed V. The applied moment Madd includes the applied yaw moment MZadd, the applied roll moment MXadd, and the applied pitch moment MYadd. The applied force Fadd includes the applied lateral force FYadd and the applied vertical force FZadd.

In this embodiment, the FF applied moment/force computing unit 53 computes the applied yaw moment MZadd, the applied roll moment MXadd, the applied pitch moment MYadd, the applied lateral force FYadd, and the applied vertical force FZadd according to the steering angles δi, the vehicle speed V, the accelerator pedal position PA, and the brake pedal position PB. The FF applied moment/force computing unit 53 can compute the applied yaw moment MZadd, the applied roll moment MXadd, the applied pitch moment MYadd, the applied lateral force FYadd, and the applied vertical force FZadd according to the steering angles δi and the vehicle speed V by using various methods. In this embodiment, the FF applied moment/force computing unit 53 makes use of a model for outputting the applied yaw moment MZadd, the applied roll moment MXadd, the applied pitch moment MYadd, the applied lateral force FYadd, and the applied vertical force FZadd in response to the input of the steering angles δi and the vehicle speed V.

The equations of motion for the lateral, yaw, roll, pitch, and heave motions of the vehicle can be expressed by following equations (1) to (5).

Lateral Movement $$m\dot{v} - m_s h_{ac}\dot{p} = \Sigma_{Yi} - mVr + F_{Yadd} \tag{1}$$

Yaw Movement $$I_Z\dot{r} = \Sigma l_i F_{Yi} + M_{Zadd} \tag{2}$$

Roll Movement $$I_{Xs}\dot{p} - m_s h_s\dot{v} = \Sigma T_i(F_{ZSi} + F_{ZJi}) + m_s h_s Vr + m_s h_{ac} g\varphi + M_{Xadd} \tag{3}$$

Pitch Movement $$I_{Y_s}\dot{q} = -\sum l_i(F_{ZSi} + F_{ZJi}) - h_s\frac{m_s}{m}\left(m\ddot{x}_{trc} + \sum F_{XGi}\right) + M_{Yadd} \tag{4}$$

Heave Movement $$m_s\dot{w} = \Sigma(F_{ZSi} + F_{ZJi}) + F_{Zadd} \tag{5}$$

where m is the vehicle mass [kg], v is the gravitational center slip angular velocity [rad/s], $m_s$ is the sprung mass [kg], $h_{ac}$ is the gravitational roll moment arm length [m], p is the roll rate [rad/s], $F_{Yi}$ is the lateral force [N] of each wheel, V is the vehicle speed [m/s], y is the yaw rate [rad/s], $I_Z$ is the yaw moment of inertia [kg m$^2$] of the vehicle, and is the fore and aft distance between the axle of each wheel and the gravitational center of the vehicle [m]($l_1=l_2=l_f$, $l_3=l_4=l_r$, $l_f$ is the distance [m] between the front wheel axle and the center of gravity, $l_r$ is the distance between the rear wheel axle and the center of gravity [m]), $I_{Xs}$ is the sprung mass roll moment of inertia around the X-axis [kg m$^2$], $h_S$ is the height of the center of gravity of the sprung mass [m], $T_i$ is the half tread of each wheel [m] ($T_1=-T_2=T_f/2$, $T_3=-T_4=T_r/2$), $T_f$, $T_r$ are the front and rear treads), $F_{ZSi}$ is the vertical force variation of each wheel due to the suspension device, $F_{ZJi}$ is the jack-up force of each wheel [N], g is the gravitational acceleration [m/s$^2$], φ is the vehicle roll angle [rad], $I_{Ys}$ is the sprung mass pitch moment of inertia about the Y axis of the vehicle coordinate system [kg m$^2$], the second derivative of $x_{trc}$ is the longitudinal acceleration [m/s$^2$] generated by the driver's accelerator operation, and $F_{XGi}$ is the contact surface fore and aft force [N].

The second derivative of $x_{trc}$, which is the fore and aft acceleration generated by the accelerator pedal operation of the driver, can be computed by determining a driver demand driving force by referring to a predetermined driving force map with respect to the accelerator pedal position PA and vehicle speed V, and processing the determined driver demand drive force by using a filter that simulates the responsiveness of the power plant 7.

Here, the lateral force $F_{Yi}$ of each wheel in Equations (1) and (2) can be obtained from the steering angle δi of the corresponding wheel and the vehicle speed V by using following equation (6).

$$F_{Yi} = -K_i\left(\frac{v}{V} + \frac{l_i}{V}r + \frac{h_c - h_i}{V}p - \delta_i\right) \tag{6}$$

The steering angle δi of each wheel in Equation (6) is the steering angle caused by the steering operation of the driver, and can be determined from the steering angle $\delta_{SW}$ [rad] and the inverse of the steering gear ratio of each wheel $\kappa_i$ by using following Equation (7).

$$\delta_i = \kappa_i \delta_{SW} \tag{7}$$

The relationship between the wheel lateral force $F_{Yi}$ of each wheel and the corresponding steering angle $\delta_{SW}$ in Equations (1) and (2) can be expressed by following equation (8) from Equations (6) and (7).

$$F_{Yi} = -K_i\left(\frac{v}{V} + \frac{l_i}{V}r + \frac{h_c - h_i}{V}p - \kappa_i \delta_{SW}\right) \tag{8}$$

The vertical force variation $F_{ZSi}$ of each wheel due to the suspension in Equations (3), (4) and (5) can be computed from the suspension main spring stiffness $K_{SPGi}$ at each wheel end, the stabilizer stiffness $K_{STBi}$ at each wheel end, and the damper damping coefficient Ci at each wheel end by using following equation (9).

$$F_{ZSi} = -C_i w_i - K_{SPGi} z_i - \frac{K_{STBi}}{T_i}(z_i - z_j) \tag{9}$$

Here, suffix j represents the wheel located laterally opposite to the wheel indicated by suffix i. For example, if suffix i denotes a front left wheel, then j denotes a front right wheel located opposite thereto. In addition, $w_i$ is the vertical velocity [m/s] of the vehicle body sprung mass at the corresponding wheel position, and $z_i$ is the vertical displacement [m] of the vehicle body sprung mass at the corresponding wheel position.

The vertical velocity $w_i$ of the sprung vehicle body at the corresponding wheel position and the vertical displacement $z_i$ of the sprung vehicle body at the corresponding wheel position can be determined from the geometric relationship as expressed by following equations (10) and (11).

$$w_i = w + T_i p - l_i q \tag{10}$$

$$z_i = z + T_i \varphi - l_i \theta \tag{11}$$

where $w_i$ is the vertical velocity of the center of gravity [m/s], and $z_i$ is the vertical displacement of the center of gravity [m].

The jack-up force $F_{ZJi}$ of each wheel in equations (3), (4) and (5) can be expressed as shown in following equation (12) by using the vertical force variation $F_{ZSi}$, the static load $F_{Z0i}$, the lateral force $F_{Yi}$, the fore and aft force $F_{XGi}$, the roll center height $h_i$, and the anti-dive lift angle $\theta_{ADi}$ of each wheel.

$$F_{ZJi} = -\frac{F_{Z0i} + F_{ZSi}}{F_{Z0i}T_i + F_{Yi}h_i} F_{Yi} h_i - F_{XGi} \tan\theta_{ADi} \tag{12}$$

The fore and aft force $F_{XGi}$ in equations (4) and (12) can be expressed as shown in following equation (13) using the second derivative of the fore and aft acceleration $x_{brk}$ generated by the driver's braking operation, the braking force distribution ratio ρi for each wheel, the vertical force variation of each wheel due to the suspension $F_{ZSi}$, the jack-up force $F_{ZJi}$ of each wheel, the static load $F_{Z0i}$ of each wheel, the lateral force $F_{Yi}$ of each wheel, and the steering angle δi of each wheel.

$$F_{XGi} = m\ddot{x}_{brk}\rho_i - \left(1 + \frac{F_{ZSi} + F_{ZJi}}{F_{Z0i}}\right)|F_{Yi}\delta_i| \quad (13)$$

Here, the braking force distribution ratio pi of each wheel may be a predetermined constant. The second derivative of $x_{brk}$, which is the fore and aft acceleration generated by the brake operation of the driver, may be computed by referring to a braking force map which is determined from the brake pedal position PB and the vehicle speed V, and by processing the driver-demanded deceleration force by a filter that simulates the responsiveness of the brake device 20.

From the foregoing, equations (1) to (5) can be arranged as given by following equations (14) to (18).

$$\dot{v} = \frac{1}{H_m}\Big\{\sum F_{Yi} + L_{Mx}\sum T_i(F_{ZSi} + F_{ZJi}) + L_r Vr + L_\phi \phi + F_{Yadd} + L_{Mx} M_{Xadd}\Big\} \quad (14)$$

$$\dot{r} = \frac{1}{I_Z}\Big(\sum l_i F_{Yi} + M_{Zadd}\Big) \quad (15)$$

$$\dot{p} = \frac{1}{H_I}\Big\{N_{FY}\sum F_{Yi} + \sum T_i(F_{ZSi} + F_{ZJi}) + N_\phi \phi + N_{FY}F_{Yadd} + M_{Xadd}\Big\} \quad (16)$$

$$\dot{q} = \frac{1}{I_{Ys}}\Big\{-\sum l_i(F_{ZSi} + F_{ZJi}) - h_s\frac{m_s}{m}(m\ddot{x}_{trc} + \sum F_{XGi}) + M_{Yadd}\Big\} \quad (17)$$

$$\dot{w} = \frac{1}{m_s}\Big\{\sum(F_{ZSi} + F_{ZJi}) + F_{Zadd}\Big\} \quad (18)$$

Here, $H_m$, $H_I$, $L_{MX}$, $L_\phi$, $N_{FY}$, and $N_\phi$ in equations (14) to (18) are as given in the following.

$$H_m = m - \frac{m_s^2 h_s h_{ac}}{I_{Xs}}, \quad (19)$$

$$H_I = I_{Xs} - \frac{m_s^2 h_s h_{ac}}{m},$$

$$L_{Mx} = \frac{m_s h_{ac}}{I_{Xs}},$$

$$L_r = -\left(m - \frac{m_s^2 h_s h_{ac}}{I_{Xs}}\right),$$

$$L_\phi = \frac{m_s^2 h_{ac}^2}{I_{Xs}}g,$$

$$N_{FY} = \frac{m_s h_s}{m},$$

$$N_\phi = m_s h_{ac} g$$

Equations (14) to (18) can be expressed by following equations (20) and (21) when the vehicle behavior state variables is x, the applied forces $F_{Yadd}$, $F_{Zadd}$, the applied moments $M_{Xadd}$, $M_{Yadd}$, and $M_{Zadd}$ by the control action are represented by a matrix u.

$$x = \begin{bmatrix} v \\ r \\ p \\ q \\ w \end{bmatrix}, \quad u = \begin{bmatrix} F_{Yadd} \\ M_{Zadd} \\ M_{Xadd} \\ M_{Yadd} \\ F_{Zadd} \end{bmatrix} \quad (20)$$

$$\dot{x} = A(x) + Bu \quad (21)$$

A and B in equations (20) and (21) are given by following equation (22).

$$A(x) = \begin{bmatrix} \frac{1}{H_m}\{\sum F_{Yi} + L_{Mx}\sum T_i(F_{ZSi} + F_{ZJi}) + L_r Vr + L_\phi \phi\} \\ \frac{1}{I_Z}\sum l_i F_{Yi} \\ \frac{1}{H_I}\{N_{FY}\sum F_{Yi} + \sum T_i(F_{ZSi} + F_{ZJi}) + N_\phi \phi\} \\ \frac{1}{I_{Ys}}\{-\sum l_i(F_{ZSi} + F_{ZJi}) - h_s\frac{m_s}{m}(m\ddot{x}_{trc} + \sum F_{XGi})\} \\ \frac{1}{m_s}\sum(F_{ZSi} + F_{ZJi}) \end{bmatrix}, \quad (22)$$

$$B = \begin{bmatrix} \frac{1}{H_m} & 0 & \frac{L_{Mx}}{H_m} & 0 & 0 \\ 0 & \frac{1}{I_Z} & 0 & 0 & 0 \\ \frac{N_{FY}}{H_I} & 0 & \frac{1}{H_I} & 0 & 0 \\ 0 & 0 & 0 & \frac{1}{I_{Ys}} & 0 \\ 0 & 0 & 0 & 0 & \frac{1}{m_s} \end{bmatrix}$$

The vehicle motion that produces the controlled target vehicle characteristics (ideal vehicle characteristics) may be expressed as follows, for example, when the yaw moment of inertia, the equivalent cornering power, the steering gear ratio, and the damper damping coefficient are given by target vehicle characteristic values (the prime symbol (') represents the target characteristic value) that may be different from the actual vehicle characteristic values.

lateral movement $m\dot{v} - m_s h_{ac}\dot{p} = \Sigma F_{Yi}' - mVr$ (23)

yaw movement $I_Z'\dot{r} = \Sigma l_i F_{Yi}'$ (24)

roll movement $I_{Xs}\dot{p} - m_s h_s \dot{v} = \Sigma T_i(F_{ZSi}' + F_{ZJi}') + m_s h_s Vr + m_s h_{ac} g\phi$ (25)

pitch movement $$I_{Ys}\dot{q} = -\sum l_i(F_{ZSi}' + F_{ZJi}) - h_s\frac{m_s}{m}\left(m\ddot{x}_{trc} + \sum F_{XGi}'\right) \quad (26)$$

heave movement $m_s \dot{w} = \Sigma(F_{ZSi}' + F_{ZJi})$ (27)

The relationship between the lateral force of each wheel $F_{Yi}'$ and the steering angle $\delta_{SW}$ of the target vehicle in equations (23) and (24) can be expressed as shown in following equation (28).

$$F_{ZSi}' = -C_i'w_i - K_{SPGi}'z_i - \frac{K_{STBi}'}{T_i}(z_i - z_j) \quad (28)$$

The vertical force variation $F_{ZSi}'$ of each wheel due to the suspension of the target vehicle in equations (25), (26), and (27) can be expressed as given by following equation (29).

$$F'_{ZSi} = -C'_i w_i - K'_{SPGi} z_i - \frac{K'_{STBi}}{T_i}(z_i - z_j) \quad (29)$$

The target vehicle's fore and aft grounding force $F_{XGi}'$ of Equation (26) can be expressed as Equation (30) below.

$$F'_{XGi} = m\ddot{x}_{brk}\rho_i - \left(1 + \frac{F'_{ZSi} + F_{ZJi}}{F_{Zoi}}\right)|F'_{Yi}\delta'_i| \quad (30)$$

The $\delta_i'$ of equation (30) is the steering angle of each wheel of the target vehicle, and can be expressed as given in following equation (31).

$$\delta_i' = \kappa_i' \delta_{SW} \quad (31)$$

Equations (23) to (27) can be rearranged as given by following equations (32) to (36).

$$\dot{v} = \frac{1}{H_m}\left\{\sum F'_{Yi} + L_{Mx}\sum T_i(F'_{ZSi} + F_{ZJi}) + L_r V r + L_\phi \phi\right\} \quad (32)$$

$$\dot{r} = \frac{1}{I_Z}\sum l_i F'_{Yi} \quad (33)$$

$$\dot{p} = \frac{1}{H_l}\left\{N_{FY}\sum F'_{Yi} + \sum T_i(F'_{ZSi} + F_{ZJi}) + N_\phi \phi\right\} \quad (34)$$

$$\dot{q} = \frac{1}{I_{Ys}}\left\{-\sum l_i(F'_{ZSi} + F_{ZJi}) - h_s\frac{m_s}{m}(m\ddot{x}_{trc} + \sum F'_{XGi})\right\} \quad (35)$$

$$\dot{w} = \frac{1}{m_s}\sum (F'_{ZSi} + F_{ZJi}) \quad (36)$$

Equations (32) to (36) can be represented as given by following equations (37) and (38) in correspondence with Equations (20) and (21). In the target vehicle model, $F_{Yadd}$, $F_{Zadd}$, $M_{Xadd}$, $M_{Yadd}$, and $M_{Zadd}$ are all 0 and given by u'. x is the vehicle behavior state variable.

$$\dot{x} = A'(x) + Bu' \quad (37)$$

$$u' = \begin{bmatrix} 0 \\ 0 \\ 0 \\ 0 \\ 0 \end{bmatrix}, \quad (38)$$

$$A'(x) = \begin{bmatrix} \frac{1}{H_m}\left\{\sum F'_{Yi} + L_{Mx}\sum T_i(F'_{ZSi} + F_{ZJi}) + L_r V r + L_\phi \phi\right\} \\ \frac{1}{I_Z}\sum l_i F'_{Yi} \\ \frac{1}{H_l}\left\{N_{FY}\sum F'_{Yi} + \sum T_i(F'_{ZSi} + F_{ZJi}) + N_\phi \phi\right\} \\ \frac{1}{I_{Ys}}\left\{-\sum l_i(F'_{ZSi} + F_{ZJi}) - h_s\frac{m_s}{m}(m\ddot{x}_{trc} + \sum F'_{XGi})\right\} \\ \frac{1}{m_s}\sum (F'_{ZSi} + F_{ZJi}) \end{bmatrix}$$

From the foregoing, the moment/force u, which should be applied in the actual control action for the vehicle with the actual vehicle parameters to demonstrate a vehicle motion of a vehicle with the target vehicle parameters, can be obtained by using following equation (39), which is obtained by substituting equation (37) into equation (21), and rearranging the obtained equation.

$$u = B^{-1}\{\dot{x} - A(x)\} = B^{-1}\{A'(x) + B'u' - A(x)\} \quad (39)$$

The FF applied moment/force computing unit 53 computes A(x) and A'(x) by solving the differential equations shown in equations (14) to (18) and (32) to (36) with an initial value of 0. The FF applied moment/force computing unit 53 then computes equation (39) by using the steering angle $\delta_i$, the vehicle speed V, etc. at each time point, and gives the applied yaw moment $M_{Zadd}$, the applied roll moment $M_{Xadd}$, the applied pitch moment $M_{Yadd}$, the applied lateral force FYadd, and the applied vertical force $F_{Zadd}$. The FF applied moment/force computing unit 53 computes the applied yaw moment $M_{Zadd}$, applied roll moment $M_{Xadd}$, applied pitch moment $M_{Yadd}$, applied lateral force FYadd, and applied vertical force $F_{Zadd}$ by using the model based on equation (39).

The FF applied moment/force distribution unit 54 distributes the applied yaw moment $M_{Zadd}$, the applied roll moment $M_{Xadd}$, the applied pitch moment MYadd, the applied lateral force FYadd, and the applied vertical force $F_{Zadd}$ into a RTC distributed FF1 to be generated by the rear wheel steering device 15, a SH distributed FF2 to be generated by the power distribution device 9, a BRK distributed FF3 to be generated by the brake device 20, and a ADS distributed FF4 to be generated by the dampers 3D and 3D. The sum of the RTC distributed FF1, the SH distributed FF2, the BRK distributed FF3, and the ADS distributed FF4 is equal to the applied force $F_{acia}$ and the applied moment $M_a$d& Each distributed FF amount FF1 to FF4 includes at least one of the applied forces and the applied moments.

The FF applied moment/force distribution unit 54 may adopt a variety of distribution methods. For example, the RTC distribution amount FF1, the SH distribution amount FF2, the BRK distribution amount FF3, and the ADS distribution amount FF4 can be computed by multiplying a predetermined distribution coefficient of 0 to 1 to the applied force $F_{add}$/applied moment $M_{add}$. For example, the RTC distribution amount FF1 may include the value obtained by multiplying a distribution factor $k_1$ to the applied yaw moment $M_Z$, the value obtained by multiplying a distribution factor $k_2$ to the applied roll moment $M_{Xadd}$, the value obtained by multiplying the applied a distribution factor $k_3$ to the applied pitch moment $M_{Yadd}$, the value obtained by multiplying a distribution factor $k_4$ to the lateral force $F_{Yadd}$, and the value obtained by multiplying a distribution factor $k_5$ to the applied vertical force $F_{Zadd}$. In addition, the rear wheel steering device 15, the power distribution device 9, the brake device 20, the dampers 3D, 5D may be given priority so that the applied force $F_{add}$/applied moment $M_{add}$ may be distributed according to a predetermined priority rule.

The FF applied moment/force distribution unit 54 may select the RTC distribution amount FF1, the SH distribution amount FF2, the BRK distribution amount FF3, and the ADS distribution amount FF4 as discussed in the following. Specifically, the applied lateral force $F_{Yadd}$ and the applied yaw moment $M_{Zadd}$ are distributed according to the RTC distribution amount FF1, SH distribution amount FF2, and BRK distribution amount FF3, and the applied roll moment $M_{Xadd}$, pitch moment $M_{Yadd}$, and vertical force $F_{Zadd}$ are distributed according to the ADS distribution amount FF4.

The relationship between the applied lateral force FYadd, the applied yaw moment $M_{Zadd}$, the rear wheel steering angle δr and the vectoring moment $M_v$ can be expressed as shown in following equations (40) and (41).

$$2K_r K_r \delta_{SW} + F_{Yadd} = 2K_r \delta_r \qquad (40)$$

$$2l_r K_r \kappa_r \delta_{SW} + M_{Zadd} = -2l_r K_r \delta_r M_V \qquad (41)$$

From equations (40) and (41), the rear wheel steering angle δr and the vectoring moment $M_v$ can be obtained as shown in following equations (42) and (43).

$$\delta_r = \kappa_r \delta_{SW} + \frac{1}{2K_r} F_{Yadd} \qquad (42)$$

$$M_V = l_r F_{Yadd} + M_{Zadd} \qquad (43)$$

From Equation (42), the rear wheel steering angle δr, i.e., the RTC distribution amount FF1, can be determined. The vectoring moment $M_v$ should be achieved by the SH distribution amount FF2 as far as possible, and the portion exceeding the upper limit of the SH distribution amount FF2 should be achieved by the BRK distribution amount FF3.

The relationship between the applied roll moment $M_{Xadd}$, the applied pitch moment $M_{Yadd}$, the applied vertical force $F_{Zadd}$, and the applied vertical forces $F_{Zadd1}$, $F_{Zadd2}$, $F_{Zadd3}$, and $F_{Zadd4}$ (the subscripts 1, 2, 3, and 4 represent the front left wheel (fl), front right wheel (fr), rear left wheel (rl), and front right wheel (n), respectively) that are to be applied to the individual wheels can be expressed as shown in following equations (44) to (46).

$$M_{Xadd} = \frac{T_f}{2}(F_{Zadd1} - F_{Zadd2}) + \frac{Tr}{2}(F_{Zadd3} - F_{Zadd4}) \qquad (44)$$

$$M_{Yadd} = -l_f(F_{Zadd1} + F_{Zadd2}) + l_r(F_{Zadd3} + F_{Zadd4}) \qquad (45)$$

$$F_{Zadd} = F_{Zadd1} + F_{Zadd2} + F_{Zadd3} + F_{Zadd4} \qquad (46)$$

Since there are only three equations to determine the applied vertical force of the four wheels, and the solution is still indeterminate, the front axle distribution ratio of the roll moment $R_{MXF}$ given in following equations (47) and (48) is introduced. The roll moment front axial distribution ratio $R_{MXF}$ is a constant value that can be set to any value from 0 to 1.

$$M_{Xaddf} = M_{Xadd} R_{MXF} \qquad (47)$$

$$M_{Xaddr} = M_{Xadd}(1 - R_{MXF}) \qquad (48)$$

By rearranging equations (44) to (48), the applied vertical forces to the respective wheels can be obtained as given in the following.

$$F_{Zadd1} = \frac{M_{Xadd}}{T_f} R_{MXF} + \frac{l_r}{2l} F_{Zadd} \qquad (49)$$

$$F_{Zadd2} = -\frac{M_{Xadd} R_{MXF}}{T_f} R_{MXF} + \frac{l_r}{2l} F_{Zadd} \qquad (50)$$

$$F_{Zadd3} = \frac{M_{Xadd}}{T_r}(1 - R_{MXF}) + \frac{l_f}{2l} F_{Zadd} \qquad (51)$$

$$F_{Zadd4} = -\frac{M_{Xadd}}{T_r}(1 - F_{MXF}) + \frac{l_f}{2l} F_{Zadd} \qquad (52)$$

Here, the ADS distribution FF amount FF4 may be selected from the applied vertical forces $F_{Zadd1}$, $F_{Zadd2}$, $F_{Zadd3}$, and $F_{Zadd4}$ of equations (49) to (52).

The vehicle behavior estimation unit 51 computes the estimated slip angle βr or the gravitational center slip angle which is estimated to occur to the vehicle 1 from the vehicle characteristics information, the front wheel steering angle δf, and the vehicle speed V. Here, the subscript "r" indicates the information about the vehicle 1 (the actual vehicle).

The estimated slip angle βr of the actual vehicle is the estimated slip angle of the vehicle 1 around the center of gravity thereof. The estimated slip angle βr of the actual vehicle may be computed from following equation (53), for example.

$$\beta = \frac{1 - \frac{1}{m} \cdot \frac{l_f}{l_r \cdot K_r} V^2}{1 + A \cdot V^2} \left( \delta_f \cdot \frac{l_r}{l} \right) \qquad (53)$$

where m is the vehicle weight, l is the wheelbase, $l_f$ is the distance between the center of gravity and the front axle, $l_r$ is the distance between the center of gravity and the rear axle, A is the stability factor, and Kr is the rear wheel cornering power. The variables m, l, $l_f$, $l_r$, A, and Kr in equation (53) may be substituted with the values obtained from the actual vehicle specification information. In other embodiments, the center of gravity slip angle βr may be computed from the fore and aft acceleration, the lateral acceleration, etc., and may be computed by using a Kalman filter.

The target vehicle behavior estimation unit 52 computes the estimated target vehicle slip angle βi, which is the center of gravity slip angle estimated to occur in the target vehicle, and the estimated target vehicle yaw rate γi, which is the yaw rate estimated to occur in the target vehicle, from the front wheel steering angle δf and the vehicle speed V, and the predetermined target vehicle characteristics. The subscript "i" indicates information about the target vehicle.

Various per se known methods may be applied in computing the estimated slip angle βi and the estimated yaw rate γi of the target vehicle. The estimated slip angle βi of the target vehicle may be computed by substituting the target vehicle characteristics into above equation (53). In addition, the target vehicle estimated yaw rate γi may also be computed from following equation (54).

$$\gamma = \frac{1}{1 + A \cdot V^2} \left( \frac{V}{l} \cdot \delta_f \right) \qquad (54)$$

The first FB yaw moment computing unit 55 computes the first FB yaw moment $M_{ZFB1}$ to be applied to the vehicle 1 by the feedback control from the center of gravity slip angle β of the vehicle 1. The first FB yaw moment computing unit 55 computes the first FB yaw moment $M_{ZFB1}$, for example, from following equation (55) corresponding to the PD control. In other embodiments, additionally or alternatively, the first FB yaw moment computing unit 55 may compute $M_{ZFB1}$ by the P control or PID control.

$$M_{ZFB1} = K_{p\beta}(\beta_i - \beta_r) + K_{d\beta}(\dot{\beta}_i - \dot{\beta}_r) \qquad (55)$$

The second FB yaw moment computing unit 56 computes the second FB yaw moment $M_{ZFB2}$ to be applied to the vehicle 1 by feedback control according to the yaw rate γ of the vehicle 1. The second FB yaw moment computing unit 56 computes the second FB yaw moment $M_{ZFB2}$, for example, by using following equation (56) corresponding to the PD control. In other embodiments, additionally or alternatively, the second FB yaw moment computing unit 56 may compute $M_{ZFB1}$ by the P control or PID control.

$$M_{ZFB2}=K_{p\gamma}(\gamma_i-\gamma_r)+K_{d\gamma}(\dot{\gamma}_i-\dot{\gamma}_r) \tag{56}$$

The FB yaw moment computing unit 57 computes the FB yaw moment $M_{ZFB}$ from the first FB yaw moment $M_{ZFB1}$ and the second FB yaw moment $M_{ZFB2}$. The FB yaw moment computing unit 57 computes the FB yaw moment $M_{ZFB}$, for example, by adding the first FB yaw moment $M_{ZFB1}$ to the second FB yaw moment $M_{ZFB2}$. Also, the FB yaw moment computing unit 57 may use the smaller or larger of the values of the first FB yaw moment $M_{ZFB1}$ and the second FB yaw moment $M_{ZFB2}$, or the average of the values of the first FB yaw moment $M_{ZFB1}$ and the second FB yaw moment $M_{ZFB2}$, as the FB yaw moment $M_{ZFB}$.

The waveform processing unit 58 smooths the waveform of the FB yaw moment $M_{ZFB}$ output from the FB yaw moment computing unit 57, and outputs the smoothed FB yaw moment $M_{ZFB}'$. The smoothed FB yaw moment $M_{ZFB}'$ eliminates sudden changes in the value.

Figure 4:
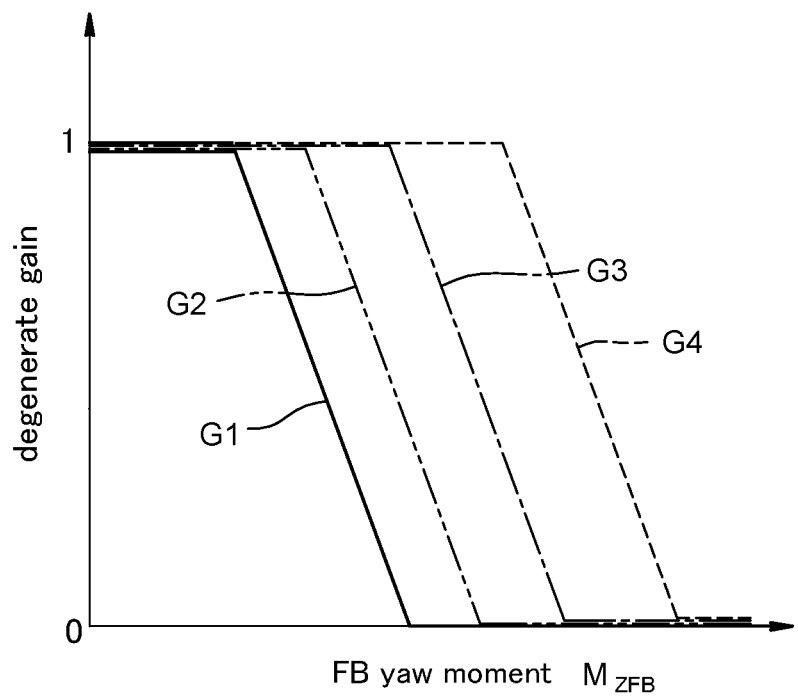
FIG. 4 is a graph showing the relationship between a FB command yaw moment and a degenerate gain.

The degenerate gain computing unit 59 sets the first to fourth degenerate gains G1 to G4 according to the smoothed FB yaw moment $M_{ZFB}'$. The first regenerate gain G1 is the gain corresponding to the RTC distribution FF amount FF1, the second degenerate gain G2 is the gain corresponding to the SH distribution FF amount FF2, the third degenerate gain G3 is the gain corresponding to the BRK distribution FF amount FF3, and the fourth degenerated gain G4 is the gain corresponding to the ADS distribution FF amount FF4. FIG. 4 is a map showing the relationship between the FB yaw moment Writ and the first to fourth degenerate gains G1 to G4. With the increase in the FB yaw moment $M_{ZFB}$, the values of first degenerate gain G1, the second degenerate gain G2, the third degenerate gain G3, and the fourth degenerate gain G4 decrease one after another in the order of first degenerate gain G1, the second degenerate gain G2, the third degenerate gain G3, and the fourth degenerate gain G4.

The RTC distribution FF amount correcting unit 61 computes the corrected RTC distribution FF amount FF1' by multiplying the RTC distribution FF amount FF1 to the first degenerate gain G1 ($M_{FF1}'=M_{FF1}\times G1$).

The SH distribution FF amount correcting unit 62 computes the corrected SH distribution FF amount FF2' by multiplying the SH distribution FF amount FF2 to the second degenerate gain G2 ($M_{FF2}'=M_{FF2}\times G2$).

The BRK distribution FF amount correcting unit 63 computes the corrected BRK distribution FF amount FF3' by multiplying the BRK distribution FF amount FF3 to the third degenerate gain G3 ($M_{FF3}'=M_{FF3}\times G3$).

The ADS distribution FF amount correcting unit 64 computes the corrected ADS distribution FF amount FF4' by multiplying the ADS distribution FF amount FF4 to the fourth degenerate gain G4 ($M_{FF4}'=M_{FF4}\times G4$).

The RTC control unit 65 computes the target control amount of the rear wheel steering device 15 from the corrected RTC distribution amount FF1', and controls the rear wheel steering device 15 according to the target control amount.

The SH control unit 66 computes the target control amount of the power distribution device 9 from the corrected SH distribution amount FF2', and controls the power distribution device 9 according to the target control amount.

The BRK control unit 67 adds the corrected BRK distribution FF amount FF3' to the FB yaw moment $M_{ZFB}$, computes a target control amount for the brake force of each wheel via the brake device 20 from the added value, and controls the brake force of each wheel according to the corresponding target control amount.

The ADS control unit 68 computes the target control amount of each damper 3D, 5D from the corrected ADS distribution amount FF4', and controls the damper, 5D according to the corresponding target control amount.

According to the above configuration, when the behavior of vehicle 1 approaches the limit driving region, and the FB yaw moment $M_{ZFB}$ increases, the values of the first to fourth degenerate gains G1 to G4 moves from 1 to 0, and the corrected RTC distribution amount FF1', the corrected SH distribution amount FF2', the corrected BRK distribution amount FF3', and the corrected ADS distribution amount FF4' are suppressed. As a result, an excessive control action by feed-forward control is suppressed, and the behavior of the vehicle 1 can be stabilized.

The first to fourth degenerate gains G1 to G4 are set according to the characteristics of the corresponding behavior control devices. In the limit driving condition range of the vehicle 1, the behavior of the vehicle is stabilized by decreasing the feed-forward control amount in the order of the rear wheel steering device 15, the power distribution device 9, the brake device 20, and the dampers 3D and 5D. The rear wheel steering device 15, the power distribution device 9, the brake device 20, the dampers 3D, 5D may each have a progressively greater effect on the behavior of the vehicle in this order, for the same amount of control. Therefore, the feed-forward control amount of the rear wheel steering device 15, the power distribution device 9, the brake device 20, and the dampers 3D, 5D can be appropriately suppressed by decreasing the values in the order of the first to fourth degenerate gains G1 to G4 in response to the increase in the FB yaw moment $M_{ZFB}$.

The present invention has been described in terms of a specific embodiment, but is not limited by such an embodiment, and can be modified in various ways without departing from the scope of the present invention. In the above embodiment, the first to fourth degenerate gains G1 to G4 were computed from the FB yaw moment $M_{ZFB}$, but in other embodiments, the first to fourth degenerate gains G1 to G4 may be computed from the target control amount of the corresponding behavior control device computed from the FB yaw moment $M_{ZFB}$.

When the vehicle 1 is considered to demonstrate an oversteer tendency by a prescribed degree, the degenerate gain computing unit 59 may set each of the first to fourth degenerate gains G1 to G4 to a value between 0 and 1. When the vehicle 1 is considered to demonstrate no oversteer tendency, the first to fourth degenerate gains G1 to G4 to the value of 1 without regard to the value of the FB yaw moment $M_{ZFB}$. Whether the vehicle 1 demonstrates an oversteer tendency or not be determined, for example, by determining if the deviation between the estimated yaw rate γi of the target vehicle and the actual yaw rate γR is within a predetermined range.

In the foregoing embodiment, the FB yaw moment $M_{ZFB}$ was generated by the brake device 20, but the FB yaw moment $M_{ZFB}$ may also be generated by the rear wheel steering device 15, the power distribution device 9, and/or the dampers 3D, 5D. Also, the FB yaw moment $M_{ZFB}$ may be distributed so as to correspond to the rear wheel steering device 15, the power distribution device 9, the brake device 20, and the dampers 3D, 5D.

In the foregoing embodiment, the applied moment and the applied force were computed by considering the fore and aft acceleration (second-order derivative of $x_{TRC}$) generated by the accelerator pedal operation of the driver, and the fore and aft acceleration (second-order derivative of $x_{BRK}$) generated by the brake pedal operation of the driver. However, in other embodiments, the applied moment and the applied force may be computed without taking into account either the fore and aft acceleration (second-order derivative of $x_{TRC}$) generated by the accelerator operation of the driver or the fore and aft acceleration (second-order derivative of $x_{BR}K$) generated by the brake operation of the driver.

The invention claimed is:

1. A vehicle control system for controlling a behavior control device for controlling a behavior of a vehicle, comprising:
   a feed-forward computing unit that computes a feed-forward control amount for the behavior control device according to a steering angle of the vehicle;
   a feedback computing unit that computes a feedback control amount for the behavior control device according to a difference between a target vehicle state variable computed from the steering angle and an actual vehicle state variable;
   a correcting unit that computes a corrected feed-forward control amount by correcting the feed-forward control amount according to the feedback control amount; and
   a target control amount computing unit that computes a target control amount of the behavior control device according to the feedback control amount and the corrected feed-forward control amount,
   wherein the vehicle behavior control device comprises a plurality of vehicle behavior control devices, and
   wherein the vehicle control system further comprises a feed-forward control amount distribution unit for computing a distribution feed-forward control amount which is to be distributed to each of the behavior control devices, the correcting unit being configured to compute a corrected distribution feed-forward control amount for each behavior control device by correcting the corresponding feed-forward control amount according to the corresponding feedback control amount by an individual correction amount.

2. The vehicle control system according to claim 1, wherein the correcting unit is configured to set a degenerate gain of 0 to 1 for each of the distribution feed-forward control amounts according to the corresponding feedback control amount, and compute the corrected distribution feed-forward control amount by multiplying each degenerate gain to the corresponding distribution feed-forward control amount, the degenerate gain decreasing from 1 to 0 with an increase in the feedback control amount.

3. The vehicle control system according to claim 2, wherein the behavior control devices include a rear wheel steering device that changes a steering angle of a rear wheel, and a power distribution device that distributes a driving power generated by a power plant to each wheel of the vehicle, and the degenerate gain for the distribution feed-forward control amount of the rear wheel steering device decreases with an increase in the feedback control amount earlier than the degenerate gain for the distribution feed-forward control amount of the power distribution device.

4. The vehicle control system according to claim 2, wherein the behavior control devices include a power distribution device that distributes a driving power generated by a power plant to each wheel of the vehicle, and a brake device for individually generating brake force in each wheel, and the degenerate gain for the distribution feed-forward control amount of the power distribution device decreases with an increase in the feedback control amount earlier than the degenerate gain for the distribution feed-forward control amount of the brake device.

5. The vehicle control system according to claim 2, wherein the behavior control devices include a brake device for individually generating brake force in each wheel, and a damper having a variable damping factor and provided for each wheel, and the degenerate gain for the distribution feed-forward control amount of the brake device decreases with an increase in the feedback control amount earlier than the degenerate gain for the distribution feed-forward control amount of the dampers.

6. The vehicle control system according to claim 2, wherein the behavior control devices include a rear wheel steering device for changing steering angle of the rear wheels, a power distribution device for distributing a driving power generated by a power plant to each wheel of the vehicle, a brake device for individually generating brake force in each wheel, and a damper having a variable damping factor and provided for each wheel, and
   the degenerate gain for the distribution feed-forward control amount of the rear wheel steering device, the degenerate gain for the distribution feed-forward control amount of the power distribution device, the degenerate gain for the distribution feed-forward control amount of the brake device, and the degenerate gain for the distribution feed-forward control amount of the damper decrease with an increase in the feedback control amount in an order of those of the rear wheel steering device, the power distribution device, the brake device and the damper.

7. The vehicle control system described in claim 2, wherein the correcting unit is configured to determine if the vehicle demonstrates an oversteer tendency, and if no oversteer tendency is determined, the degenerate gain is set to 1 without regard to values of the feedback control amounts.

* * * * *